Patented May 19, 1925.

1,538,269

UNITED STATES PATENT OFFICE.

LOUIS JEAN BAPTISTE AUGUSTIN COLAS, OF PARIS, FRANCE, ASSIGNOR TO HIMSELF AND ANDRE PAUL JOSEPH COLAS, OF PARIS, FRANCE, AND SOCIÉTÉ L'ALFA, SOCIÉTÉ ANONYME POUR LA FABRICATION DES PÂTES DE CELLULOSE, OF PARIS, FRANCE, A COMPANY OF FRANCE.

TREATING BLACK LIQUORS FROM THE CAUSTIC-SODA TREATMENT OF CELLULOSIC SUBSTANCES.

No Drawing.   Application filed April 30, 1923.   Serial No. 635,774.

*To all whom it may concern:*

Be it known that I, LOUIS JEAN BAPTISTE AUGUSTIN COLAS, citizen of the Republic of France, residing at Paris, Seine, France, have invented certain new and useful Improvements in Treating Black Liquors from the Caustic-Soda Treatment of Cellulosic Substances, of which the following is a specification.

This invention relates to a process for methodically treating black liquors for the purpose of extracting the substances contained therein and separating them from one another, the said black liquors being derived from the lixiviation with caustic soda and subsequent washing of vegetable matter, more particularly of alfa, in connection with the manufacture of cellulose pulp.

The substances extracted from vegetable matter by lixiviation and washing are found in black liquors simultaneously and in three different forms:

1. As relatively big particles in suspension in the liquor and slowly and spontaneously aggregating;
2. In colloidal solution;
3. In true solution, combined with soda or not.

The process according to the invention is characterized by the addition of a certain quantity of a suitable flocculating agent to the black liquor, the said agent being preferably an organic acid such as acetic acid or oxalic acid or a salt of the said acids, such as calcium acetate, which partially or totally frees the fine particles so that the latter may be easily separated together with the particles in suspension in the interstitiary liquid. The material is separated by decantation, centrifuging, filtering or cataphoresis, the operation being carried out in one or several stages. The residual liquid is moreover treated by means of certain absorbents.

The following procedure may be set forth by way of example:

500 grammes of acetate of calcium (selected as the flocculating agent), are added to 100 litres of black liquor. The mixture is stirred at ordinary temperature for a period of time varying with the nature of the said liquor, and is thereafter centrifuged or filtered.

Should oxalic acid be selected as the flocculating agent, a suitable proposition is 5 litres of oxalic acid in saturated solution at 15° C. for 100 litres of black liquor. The particles in suspension and the fine particles thus extracted by flocculation and centrifuging or filtration are exhausted by a suitable solvent such as for instance carbon tetrachloride or trichlorethylene whereby fatty or resinous matter may be separated and thereafter refined. The material thus freed from fatty or resinous matter may be hydrolized for the purpose of producing after fermentation a certain amount of ethylalcohol; or it may be subjected to destructive distillation; or again it may be subjected to the ordinary treatment of fractional dissolution, freezing etc., for the purpose of separating the various components which may be suitable for any particular use. These various operations may be carried out in succession.

The residual liquid left after the fine particles are separated by flocculation, is first treated with a base such as lime, magnesia and the like. It may be treated in certain cases at a suitable temperature with powdery animal black and be thereafter freed (by centrifuging or filtration) from the remaining small particles and from a certain amount of matter originally in solution and subsequently fixed by the bases or by the animal black.

When oxalic acid is used, the latter may be preliminarily recovered by being fixed on a suitable amount of lime. Lime, magnesia or animal black act mainly by absorption and retain a large proportion of the matter which has remained in colloidal solution and true solution in the black liquor. In the case of lime being used, a suitable proportion thereof is 15 to 20% of the weight of the matter which has remained in solution.

After lime has been used and has been separated as above described, it is treated by a suitable solvent which removes a portion of the matter retained, and is thereafter regenerated by distilling off the remaining retained matter, the said distillation being carried to calcination.

Finally, after being treated with a base or animal black, the liquid still contains volatile substances which are extracted by fractional distillation. These volatile substances form mainly while lixiviation is proceeding so that it may be advantageous to add to the residual liquid, for this operation, the products of condensation of the vapours escaping from the lixviators if the said vapours are not to be distilled separately. Distillation is proceeded with until the liquid reaches a suitable degree of concentration. The liquor is thereafter preliminarily treated or not for the purpose of extracting certain organic substances and is then treated in a calcining furnace in which soda is recovered as a more or less caustic carbonate, the said furnace being arranged so that the products of transformation of the remaining organic matter are simultaneously recovered.

It is understood that the above examples, as regards the flocculating agent or the substances added to the black liquor or the proportion of admixture of the said substances or the temperature at which the process is carried out, are given as information for assisting the work. The scope of the present invention is not limited by these examples. The right, moreover, is reserved to replace caustic soda by any other alkali and to apply the fundamental principles of the present process for treating black liquor from the lixiviation of vegetable matter, to alkaline or earth-alkaline bisulphites.

Having now particularly described and ascertained the nature of my said invention as well as the manner in which the same is to be performed, what I claim as new is:

1. A process of treating the black liquors obtained from the lixiviation of vegetable matter with caustic soda for the purpose of extracting the substances contained therein, comprising the steps of subjecting the liquor to the action of a flocculating agent to coagulate the fine particles of material; extracting the coagulated particles and the larger particles in suspension in the interstitiary liquid; subjecting the residual liquid to the action of a base to separate the remaining fine particles and a portion of the substances in solution; and then freeing the liquid from said separated particles and substances.

2. A process of treating the black liquors obtained from the lixiviation of vegetable matter with caustic soda for the purpose of extracting the substances contained therein, comprising the steps of subjecting the liquor to the action of an organic acid flocculating agent to coagulate the fine particles of material; extracting the coagulated particles and the larger particles in suspension in the interstituary liquid; subjecting the residual liquid to the action of a base to separate the remaining fine particles and a portion of the substances in solution; and then freeing the liquid from said separated particles and substances.

3. A process of treating the black liquors obtained from the lixiviation of vegetable matter with caustic soda for the purpose of extracting the substances contained therein, comprising the steps of subjecting the liquor to the action of a flocculating agent to coagulate the particles of material in colloidal solution; extracting the coagulated particles and the particles in suspension in the interstitiary liquid; subjecting the residual liquid to the action of a base to extract the remaining particles and a portion of the substances in solution; freeing the liquid from said separated particles and substances; subjecting the freed liquid to fractional distillation; and calcining the residual concentrated liquid.

4. A process of treating the black liquors obtained from the lixiviation of vegetable matter with caustic soda, for the purpose of extracting the substances contained therein, comprising the steps of subjecting the liquor to the action of a flocculating agent to coagulate the particles of material in collodal solution; extracting the coagulated particles and the particles in suspension in the interstitiary liquid; subjecting the residual liquid to the action of lime to extract the remaining particles and a portion of the substances in solution; freeing the liquid from said separated particles and substances; subjecting the freed liquid to fractional distillation; and calcining the residual concentrated liquid.

In testimony whereof I affix my signature.

LOUIS JEAN BAPTISTE AUGUSTIN COLAS.